United States Patent Office 2,976,414
Patented Mar. 21, 1961

2,976,414

METHOD OF CONTINUOUSLY ANALYSING ETHYLENE OXIDE IN THE PRESENCE OF ETHYLENE BY INFRA-RED ABSORPTION

Heinz Warncke, Koln-Bickendorf, Germany, assignor to Farbenfabriken Bayer Aktiengesellschaft, Leverkusen, Germany, a corporation of Germany No Drawing. Filed May 2, 1957, Ser. No. 656,501

Claims priority, application Germany May 18, 1956

3 Claims. (Cl. 250—43.5)

For obtaining ethylene oxide by catalytic oxidation of ethylene, it is of great importance that the final gas should be continuously analysed as regard its ethylene oxide content. This problem of analysis has so far not been satisfactorily solved. The hitherto usual method of measuring the heat conductivity is too insensitive and liable to breakdown; moreover, a chemical auxiliary reaction is required in order to make the measurement in the existing multi-component mixture specific for ethylene oxide. This auxiliary reaction produces further difficulties due to solubility of individual components in the absorber liquid and due to variation in the water vapour content.

It is known to detect ethylene oxide by infra-red absorption with non-dispersive infra-red apparatus. If the method of positive filtering with a selective pneumatic receiver is used for this purpose, which method is the most suitable and is relatively insensitive to disturbing influences, it would be necessary when using the usual method to charge the receiving chambers and the capacitative pressure receiver with ethylene oxide (in suitable admixture with a non-absorbing gas). This charging with the gas to be detected is however not possible in the case of ethylene oxide, because substances for absorbing carbon dioxide and water vapour have to be introduced simultaneously into the receiving chambers and these substances would react with the ethylene oxide. Furthermore, without drying, there would be a certain reaction between the ethylene oxide and the windows consisting of halides and pervious to the infra-red. It is now known to use in such cases a substitute receiver gas the infra-red spectrum of which coincides as far as possible with that of the gas to be detected, but which on the other hand is suitable as charging gas for the diaphragm condenser. Such substitute gases can easily be found for hydrocarbons if the hydrogen band at $3.3\mu$ is utilised for the measurement. Of course, there are then numerous "cross-sensitivities," which limit the application of this method, even if the gas to be detected is the only component which absorbs infra-red. Thus, the analysis of ethylene oxide and air mixtures can for example be conveniently carried out with ethylene as the receiving gas.

This method cannot of course be used when the mixture to be analysed also contains ethylene or other hydrocarbons. It is then necessary to find a receiving gas whose only absorption conditions which are the same as those of ethylene oxide are at positions at which ethylene and other infra-red absorbing gases present in the mixture do not absorb. The only ethylene oxide absorption whose intensity and spectral position are suitable for this purpose is that of the epoxy ring at $7.8\mu$. Nitrous oxide has been found to be a very suitable substitute gas for this purpose. It is true that it shows a certain cross-sensitivity with respect to carbon monoxide and to a smaller degree with respect to carbon dioxide, but this can be sufficiently suppressed in the usual way by optical filtering. As an additional advantage, diaphragm condensers filled with nitrous oxide have a substantially more constant zero point constancy (independent of temperature) than receivers filled with ethane or ethylene oxide.

I claim:

1. In the positive filtering method using a non-dispersion type infra-red analyzer with a substitute receiver gas, the improvement which comprises carrying out the continuous determination of ethylene oxide in gaseous mixtures containing at least one hydrocabon in addition to ethylene oxide by subjecting the gaseous mixture containing ethylene oxide and said at least one hydrocarbon to infra-red radiation using a substitute receiver gas comprising nitrous oxide in admixture with a non-absorbing gas.

2. The improvement according to claim 1 wherein argon is used as said non-absorbing gas.

3. The improvement according to claim 1 in which the gaseous mixture to be analyzed contains ethylene in addition to ethylene oxide.

References Cited in the file of this patent

UNITED STATES PATENTS

| | | |
|---|---|---|
| 2,555,327 | Elliott | June 5, 1951 |
| 2,674,696 | Smith et al. | Apr. 6, 1954 |
| 2,681,415 | Liston | June 15, 1954 |
| 2,721,942 | Friel et al. | Oct. 25, 1955 |
| 2,761,061 | Troy | Aug. 28, 1958 |

FOREIGN PATENTS

| | | |
|---|---|---|
| 702,622 | Great Britain | Jan. 20, 1954 |

OTHER REFERENCES

Control of Product Quality by Plant-Type Infrared Analyzers by Martin, published in Instruments, vol. 22, pages 1102 to 1105, December 1949.